United States Patent [19]

Barbeau et al.

[11] 3,838,461

[45] Sept. 24, 1974

[54] AERODYNAMIC PARTITIONING MECHANISM FOR RANDOM ACCESS MEMORY WITH FLEXIBLE ROTATING DISCS

[75] Inventors: Raymond A. Barbeau; Bernard W. McGinnis; James A. Weidenhammer, all of Poughkeepsie, N.Y.

[73] Assignee: International Business Machines Corporation, Armonk, N.Y.

[22] Filed: July 2, 1973

[21] Appl. No.: 375,987

[52] U.S. Cl. .................................................. 360/99

[51] Int. Cl. ............................................ G11b 15/00

[58] Field of Search .............. 340/174.1 E, 174.1 C; 179/100.2 P; 346/137, 74 MD

[56] References Cited

UNITED STATES PATENTS

| | | | |
|---|---|---|---|
| 3,618,055 | 11/1971 | Van Acker et al. | 179/100.2 A |
| 3,703,713 | 12/1972 | Pohm et al. | 179/100.2 A |
| 3,731,292 | 5/1973 | Kelly | 179/100.2 A |

*Primary Examiner*—Vincent P. Canney
*Attorney, Agent, or Firm*—Robert Lieber

[57] ABSTRACT

A blade with distinctive aerodynamic contours partitions the rotational path of a laminar configuration of continuously rotating flexible magnetic disc foils at randomly selected disc interface positions. The blade thrusts deeply into the pack with distinctively skewed motion gradually and progressively distorting the rotational path of the encountered random segment of discs. Air circulating under slight pressure through passages in the blade into the interface opening formed by the blade operates to suppress fluttering of the discs in the complementary (undeformed) segment.

10 Claims, 21 Drawing Figures

PATENTED SEP 24 1974 3,838,461

SHEET 5 OF 5

AERODYNAMIC PARTITIONING MECHANISM FOR RANDOM ACCESS MEMORY WITH FLEXIBLE ROTATING DISCS

CROSS REFERENCES TO RELATED APPLICATIONS

The following co-pending patent applications filed simultaneously herewith disclose related subject matter and relevant portions of their disclosures are intended to be incorporated herein by this and subsequent references:

1. Application Ser. No. 375,989, filed July 2, 1973 by R. A. Barbeau, B. W. McGinnis, A. W. Orlando, J. A. Weidenhammer, entitled "Partitionable Disc Memory With Flexible Discs And Conformally Suspended Head."

2. Application Ser. No. 375,985, filed July 2, 1973 by R. O. Cobb and J. Lipp, entitled "Edge Locating Apparatus".

BACKGROUND OF THE INVENTION

1. Field of the Invention

Multi-disc rotating memories for random access mass storage; wherein confined recording surfaces of continually rotating flexible magnetic discs in a dense laminar configuration are randomly accessed by flexed distortion, causing the rotational path of the aggregate to be partitioned into discretely separate segments having an intervening space suitable for accommodating a transducer.

2. Prior Art

U.S. Pat. Nos. 3,509,553, 3,618,055 and 3,703,713 disclose partitioning mechanisms, for continuously rotating packs of flexible magnetic storage discs, having a grooved or channeled structure for segregating and guiding a single randomly selected disc into operating relation with a transducer incorporated in the structure. A problem with this type of partitioning structure is the impedance it presents to rotation of the selected disc. Since recording density is related to rotational speed and head spacing such interference can limit the utility of such structures.

Lynott et al, *IBM Technical Disclosure Bulletin*, Volume 12, No. 1, June 1969, Page 81, describe partitioning of similar laminar flexible disc aggregates, but with individual discs horizontally oriented and without isolation of individual discs. A partitioning probe moves first radially (horizontally) and then axially (vertically), relative to the periphery of the rotating discs, to displace the path of rotation at a ramdomly selected interface. A problem with this is that with a rapidly operating probe and high rotational disc velocity the undisplaced discs would be rendered unstable by the probe operation and thereby interfere with emplacement of a transducer in the space vacated by the deflected discs. Anothe problem is that the deflected discs are subject to wearing and tearing stress from the probe, limiting practical application.

SUMMARY OF THE PRESENT INVENTION

The subject partitioning mechanism has distinctive aerodynamic design and slewing motion, relative to a rotating aggregate of vertically oriented flexible discs, enabling it to perform the partitioning operations taught by Lynott et al on vertically oriented discs with reduced imposition of wearing stress on the deflected discs and with quickly damped stabilization of the undeflected discs. Thus it is more practically useful to establish openings for effective transducing access to the discs.

The mechanism comprises a hollow blade having airfoil contours on the side which deflects discs and ports in that side to conduct lightly pressurized air through the hollow interior into the space vacated by the deflected discs at a distinct critical angle. The blade is thrust deeply into the aggregate into alignment with a predetermined chord. Its motion is distinctively slewed at a critical oblique angle towards the deflected discs facing the contoured side. This causes a supportive and lubricational air film to be formed hydrodynamically between the contoured side of the blade and the deflected discs lessening the wear stress imposed on the latter. The cross sectional camber of the blade contour is varied continuously and progressively along the length of the blade, so that the displacement of the deflected discs is optimally gradualized yet of sufficient magnitude to form a vacated space suitable for accommodating the separately suspended transducer.

The foregoing and other features, objectives and characteristics of the subject invention will be more completely understood and appreciated from the following detailed description and claims.

DETAILED DESCRIPTION

Apparatus Configuration

Following is a description of apparatus employing the subject partitioning mechanism. Details of elements which do not affect blade operation (e.g. specifics of the transducer assembly) are omitted. Such details are found in the above cross-referenced co-pending patent application by R. A. Barbeau, B. W. McGinnis, A. W. Orlando and J. A. Weidenhammer.

Referring to FIGS. 1–8 subject apparatus comprises disc pack sub-assembly 2, stabilizing members 4*a*, 4*b* and 4*c* and access sub-assembly 6.

Disc Sub-assembly

Figure 3:
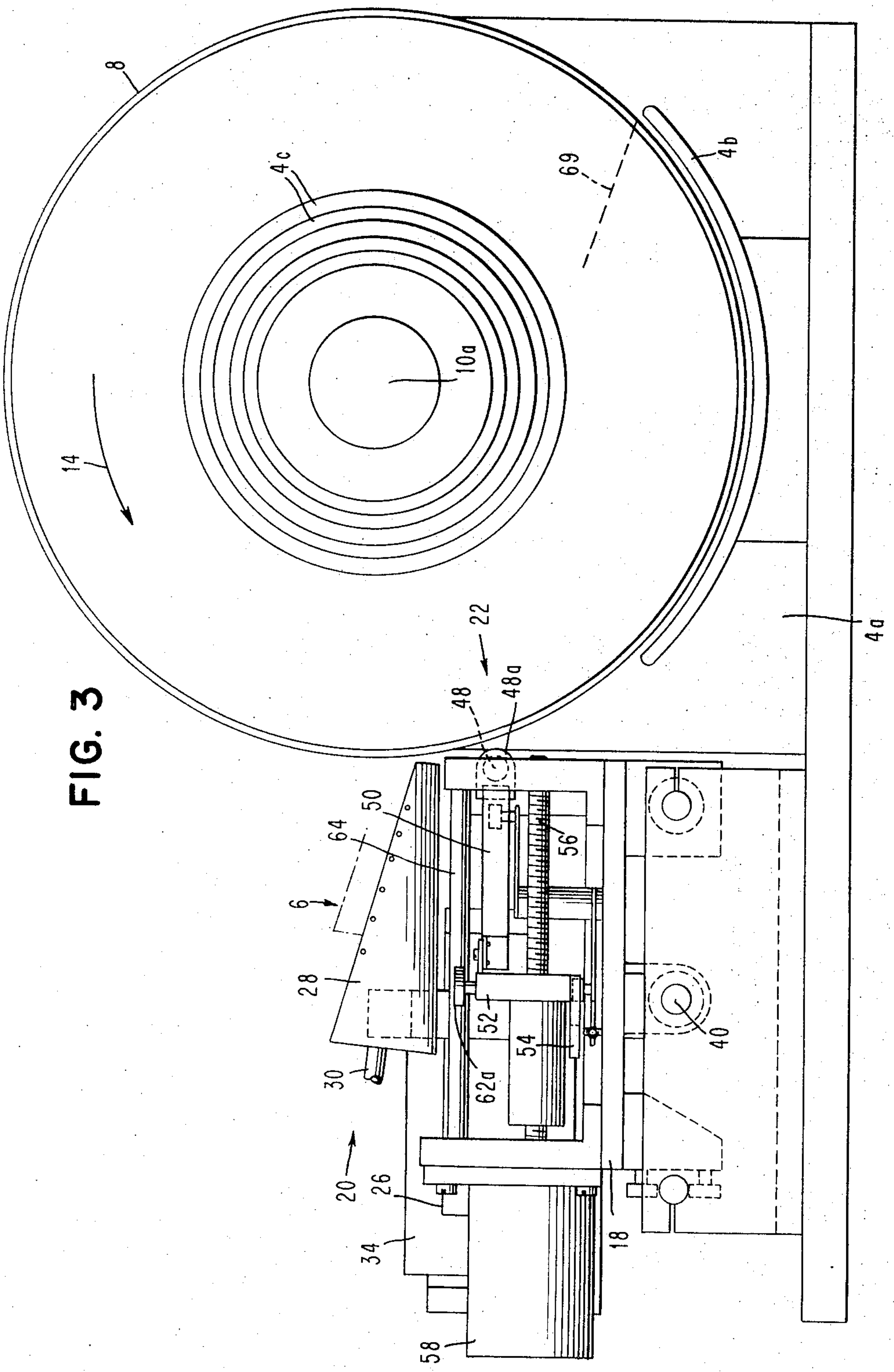
Figures 4, 5, 8:
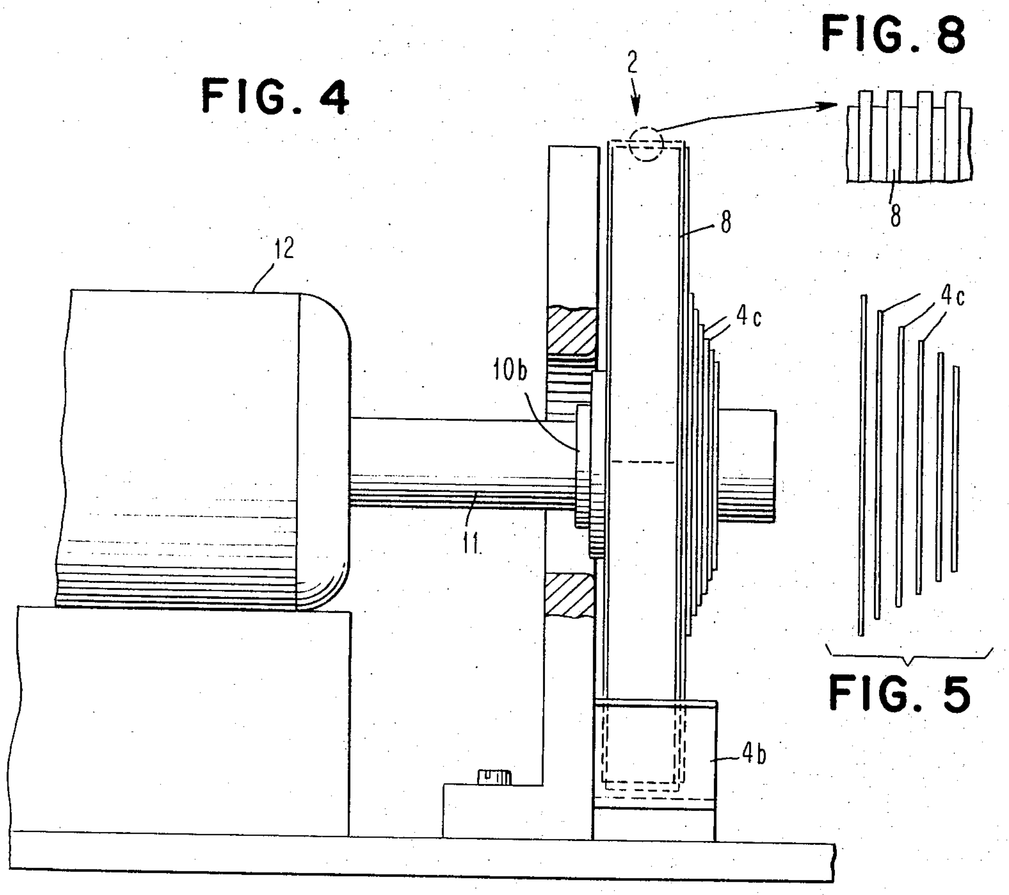
FIGS. 4–7 illustrate the disc sub-assembly and motion stabilizing elements associated therewith.
FIG. 8 illustrates a detail of the disc edges in FIG. 4 showing the use of discs having alternately varied diameters to provide edge delineation for access location as well as edge separation to facilitate accurate blade insertion.
Figure 6:
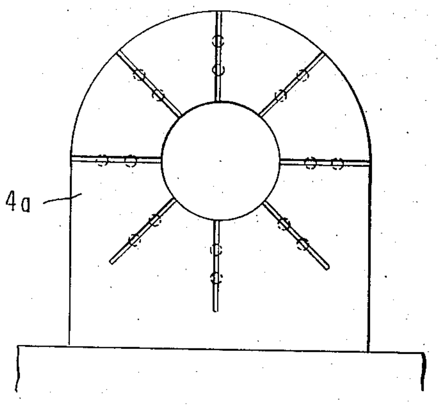
Figure 7:
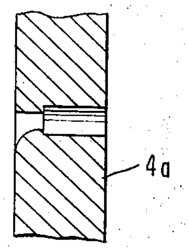

Disc aggregate 2 comprises several hundred ultra-thin (nominal thickness 0.0017 inches) flexible disc-shaped magnetic record foils 8. These are secured by clamps 10*a*, 10*b* (FIG. 4) to a generally horizontal spindle which threads into shaft 11. The discs are freely flexible around the clamps. The shaft is driven by motor 12 (FIG. 4). The discs have nominal diameters of 12 inches; alternate discs being shortened slightly to 11.9 inches diameter (FIG. 5) to provide for edge discrimination by not shown edge locating apparatus. The discs are cut from webs of magnetic oxide coated mylar (mylar thickness in inches approximately 0.0015; oxide coating thickness approximately 0.0002). Shaft 11 is rotated by motor 12 continuously at high speed (approximately 1,800 rpm) in the direction indicated by arrow 14 (FIG. 3).

Access Sub-assembly (FIGS. 1–3, 6–8)

Access sub-assembly 6 comprises carriage 18, partitioning sub-assembly 20, transducing sub-assembly 22 and a not shown locating sub-assembly for locating the interface between discs at which partitioning is to occur. The locating sub-assembly forms no part of the present invention and may be be either of conventional construction, as described in the prior art references cited above, or of specialized improved construction as described in above cross-referenced co-pending patent application number 2 by R. O. Cobb and J. Lipp.

Partitioning Sub-assembly

Figure 9:
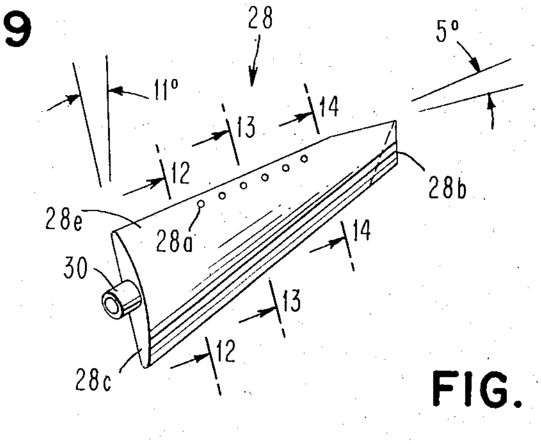
FIGS. 9–11 provide several perspective and elevational views of the subject partitioning blade.
Figure 10:
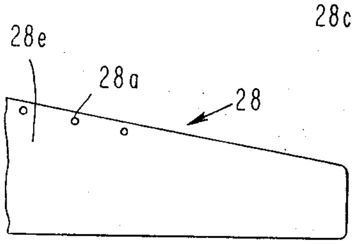
Figure 11:
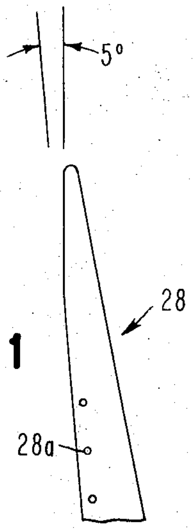
Figure 12:
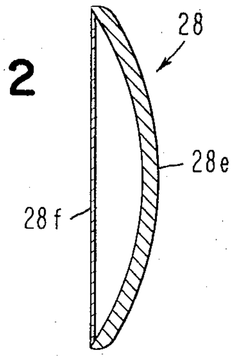
FIGS. 12–14 are sectional views of the mechanism taken along respectively numbered lines indicated in FIG. 9.
Figure 13:
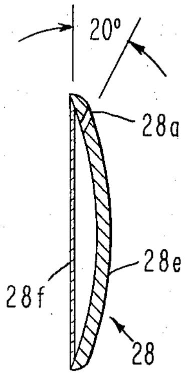

Partitioning sub-assembly 20 comprises shaft 24 secured to chassis 25 which is fastened to carriage 18, base plate 26 slideable on shaft 24, and air foil blade 28 secured rigidly to plate 26. Blade 28 contains hollow passages 28a (FIGS. 9–11). These connect with tube 30 to conduct air under slight pressure, into partition opening spaces fromed by the blade, with pack stabilization effects discussed later. Carriage 18 is movable longitudinally relative to pack 8 by rotation of screw 40; causable by not shown motive means. Plate 26 is movable into and out of pack 8, in a direction oblique to the rotational paths of the undisturbed discs, by actuation of piston rod 32 from pneumatic chamber 34. Admission of air under pressure to chamber 34 via tube 36 thrusts piston rod 32 outwardly extending blade 28 into contact with the rotating pack at a randomly selected interface of the discs. This partitions the path of revolution of the pack at the selected interface into discretely separated rotating segments which diverge and converge around the blade forming a sizable opening suitable for transducing access. Release of air from chamber 34 permits rod 32 to return, under the influence of a not shown spring, to a retracted position in which the blade is removed from partitioning engagement with the pack. In this position screw 40 is permitted to drive carriage 18 in traverse, under control of the above-mentioned edge locating assembly, to position blade 28 in alignment with another randomly selected disc interface; whereupon the partitioning process may be repeated. The contours and motion of the blade, and damping effects of stabilizing elements discussed later, cause the partitioned pack to assume aerodynamically stable rotational configurations very shortly after initial contact with the blade (e.g. 200 × $10^{-3}$ seconds).

Transducer Sub-assembly

Sub-assembly 22 (FIGS. 1–3) comprises compound radius magnetic head 48 suspended on dual cantilevered beam spring arm 50. The remote end of arm 50 is fastened via crosspiece 52 to movable baseplate 54. Plate 54 is arranged to be translated by screw 56 perpendicular to the direction of movement of carriage 18. Thus, when screw 56 is rotated by step motor 58 the entire assembly 54, 52, 50, 48 translates in a direction generally perpendicular to the axis of the discs subject to constraints on arm 50 discussed next.

Figure 1:
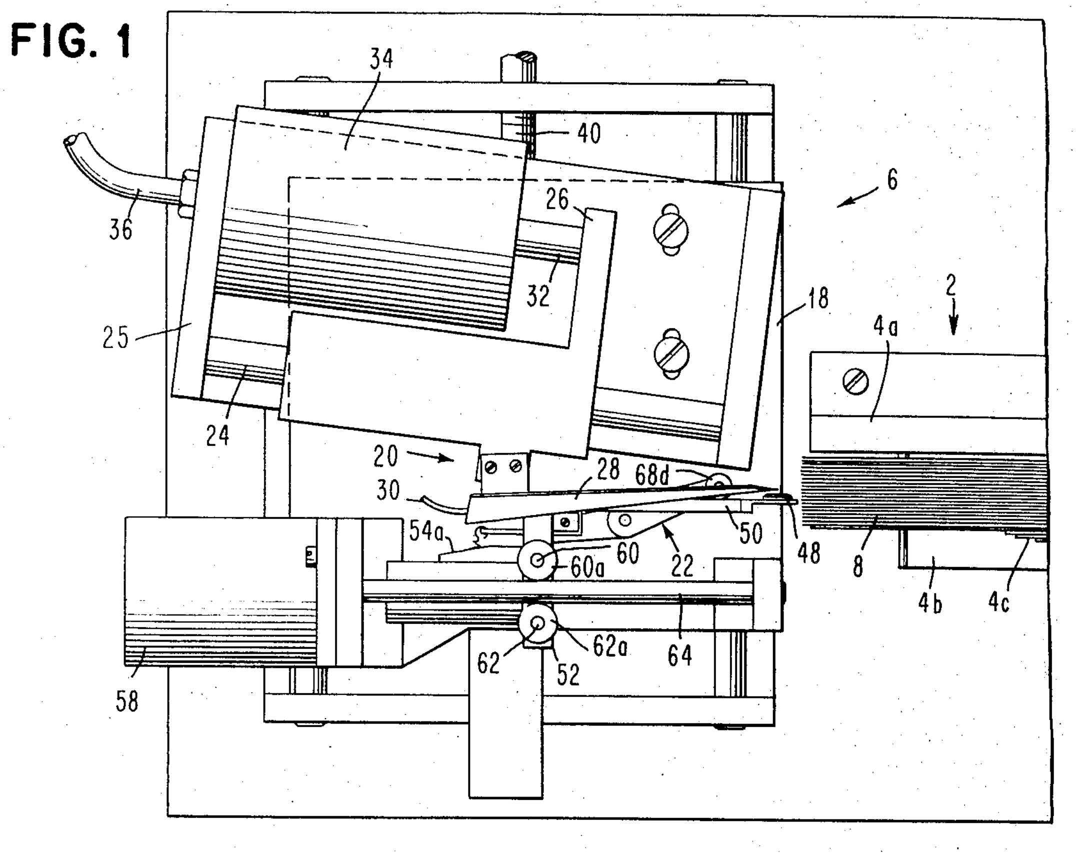
FIGS. 1–3 contain top, side elevational views of preferred apparatus incorporating the subject partitioning mechanism.
Figure 2:
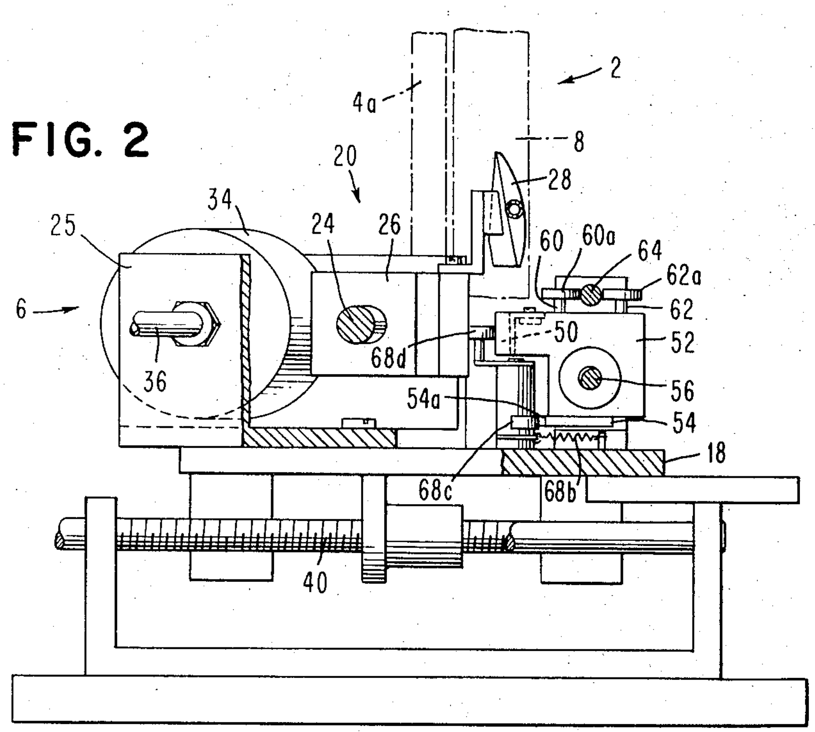

As viewed in FIG. 1, the assembly is in an extreme withdrawn position relative to the discs. The axial position of part 52 is such that in the absence of flexing constraints on arm 50 movement of the head toward the partitioned discs would be obstructed by a few of the undeflected discs (the discs to the left of the blade tip as viewed in FIG. 2). However roller 68*c* of rotatable bell-crank assembly 68 partially viewable in FIG. 2 is held by camming surface 54*a* of plate 54 in a position in which an opposite roller 68*d* operates to bend arm 50 displacing head 48 to a position of clearance relative to the obstructive undeflected discs (i.e., toward the right as viewed in FIG. 2 or downwardly as viewed in FIG. 1). But as plate 54 is advanced toward the partition interface, by action of screw 56 and step motor 58, a descending slope in cam surface 54*a* is followed by roller 68*c* enabling the bell-crank assembly to rotate under the influence of spring 68*b* and causing roller 68*d* to swing out of interfering position relative to arm 50. This causes head 48, which at this stage of movement is inside the opening in the partitioned interface between discs, to pivot toward the undeflected discs. With predetermined tension on arm 50, due to the axial position of part 52, the head assumes stable conformal air lubricated gliding relation to the interfacing surface of the undeflected disc sub-aggregate. This forms a conformal dimple in the latter surface, at its rotational interface with the head, in conformance with the convex contours of the head.

OPERATION OF APPARATUS

Figure 14:
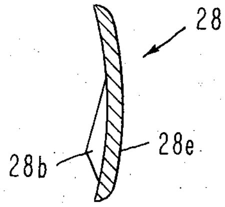
Figure 15:
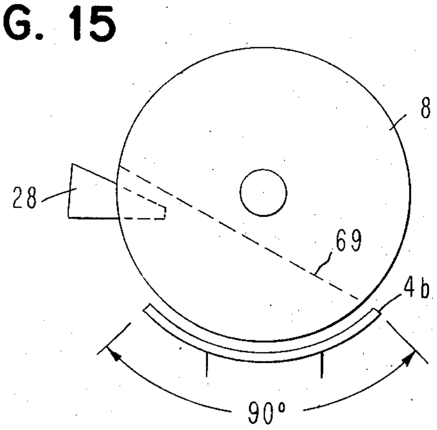
FIGS. 15–21 provide views of the partitioning blade and discs useful for explaining blade motion.
Figure 16:
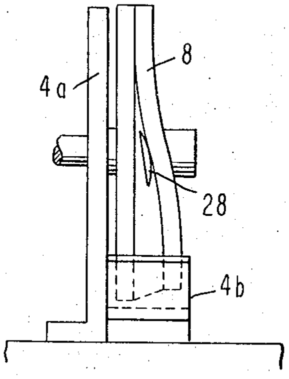
Figure 17:
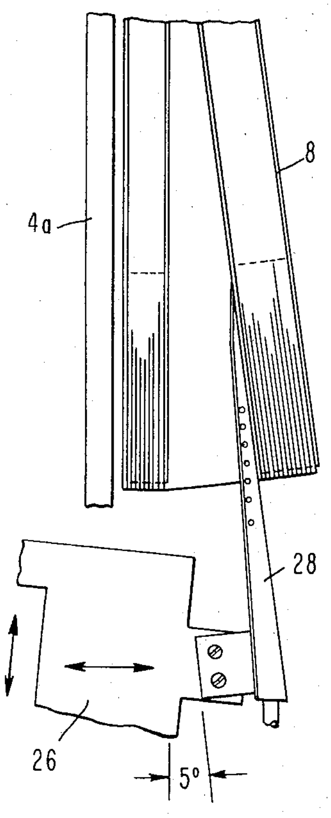
Figure 18:
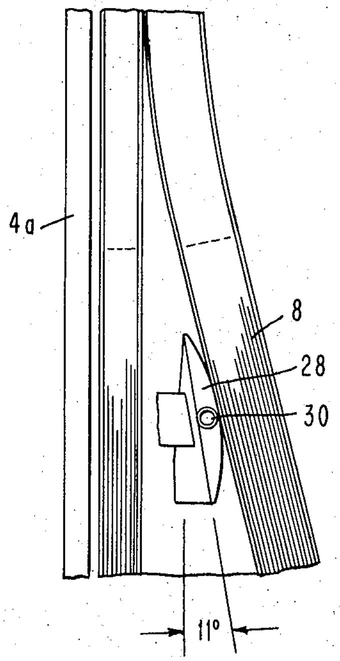

In operation sub-assemblies 20 and 22 are translated parallel to the rotational axis of the discs in retracted (withdrawn) position removed from the periphery of the drum traced by the discs. Upon alignment of the tip of blade 28 with a desired randomly selected disc interface, the path of rotation of the pack is partitioned by operation of assembly 20. Blade 28 is thrust deep into the rotational volume traced by the discs moving obliquely to one side (to the right as viewed in FIGS. 2, 14 and 15) until it aligns with chord 69 (FIG. 3). The gradually varying camber of the blade contour facing the deflected discs (those displaced by the skewed motion) forms a supportive hydrodynamic air film relative to those discs while gradually extending the deflection to widen the space between deflected and undeflected disc segments. Due to operation of stabilizing elements discussed later, the partition configuration stabilizes quickly with the deflected discs gliding smoothly around the blade and the undeflected discs resuming circular rotation.

Upon stabilization of the partitioned discs, assembly 22 is actuated to maneuver shoe 48 into the partition space at first in a position of assured clearance relative to the undeflected discs and then, by action of cam 54a and assembly 68, swinging it over towards the nearest disc surface of the undeflected segment. This positions the head at a peripheral zone or track of the opposed disc surface. As explained above, the pivotal tension on arm 50 is pre-adjusted to a predetermined condition enabling the shoe to form a complementary contour (dimple) in the facing disc surface with an intimately thin intervening lubricating air film between the shoe and the disc surface. The gliding (or flying) shoe then advances radially, by continued operation of motor 58, to a randomly selected track position.

STABILIZATION

Stabilization of the rotating disc pack after partitioning requires damping of components contributing to flutter and other unstable motion characteristics. A series of flexible "washer discs" 4c (FIGS. 4,5) operate relative to the deflected segment as a variable rate spring which damps the partitioning motion of the deflected discs (the discs deflected to the right as viewed in FIGS. 16–21). These "washers" have the following detailed configuration of thickness, compositional construction and diameter specified in the above cross-referenced application by R. W. Barbeau, B. W. McGinnis, A. W. Orlando and J. A. Weidenhammer.

Partial shroud 4b (FIGS. 3 and 4) subtends a 90°–105° arcuate portion of the cylinder of rotation traced by the pack. The end of the shroud furthest from the blade is substantially in line with the upper edge of the fully inserted blade and coincident with the extension of chord 69 (FIG. 3). The length of the shroud parallel to the axis of the pack is sufficient to span the partitioned discs and thereby receive the full air flow of the partition space. The shroud controls this air flow and limits the tendency of the deflected segment of the pack to flutter relative to blade 28.

Reference plate 4a (FIGS. 2, 4) serves to control air flow relative to the undisturbed discs. Grooves and connecting ducts in this plate (FIGS. 6, 7) allow for the passage of entrapped air, between the plate and the nearest disc of the pack, with stabilizing effect.

Slightly pressured air conducted thru the hollow interior of blade 28 passes thru openings 28a in the blade (FIGS. 9–14). This serves to modify the air flow within the confined space between partitioned disc segments in a manner effective to counteract (i.e., damp) fluttering tendency of discs in the undeflected segment during the partitioning action.

Thus, as blade 28 advances to its ultimate position of alignment with chord 69 (FIGS. 3,15) the rotational paths of the deflected discs are progressively displaced in conformance with and in compliant gliding relationship to the interfacing blade contours. The motion of the deflected and undeflected segments due to partitioning turbulence quickly stabilizes so that the axial position and shape of the partition interface become sufficiently determinate to permit insertion of the transducing assembly without interference from the rotating discs.

DETAILS OF PARTITIONING ASSEMBLY AND OPERATION (FIG. 9–21)

As indicated in FIGS. 9–14, the contour of the blade from its engaging tip **28*b* to its opposite end 28*c* has continuously varied crosssectional camber, permitting the blade to operate as an air foil while gradually deflecting and lubricatively supporting the partitioned pack. The openings 28*a* in the leading edge of the contoured face of the blade (relative to the entrapped air flow of the discs) are suitably dimensioned at 0.030 inches diameter and suitably situated to conduct air (thru supply tube 30 and the hollow interior of the blade described later) between the partitioned discs at a critical angle of approximately 7°–11° away from the rotational plane of the undeflected disc and towards the deflected disc. Carrier plate 26 supporting the blade moves at an oblique angle of approximately between 4° and 11° (FIG. 9**) relative to the rotational plane of the undeflected disc. Observations indicate that foregoing air supply angle, blade slewing angle and blade contours, within stated range limits, are critical to effecting quickly stabilized partitioning, with minimum wear and tear stress on the selected discs.

The blade is a hollow structure formed by welding a contoured strip **28*e*, with openings 28*a* to flat end pieces 28*f*,28*g*. These strips and pieces may be made of steel or brass. Piece 28*g* has opening fitted with supply coupling 30** for connection to the external air source.

Figure 19:
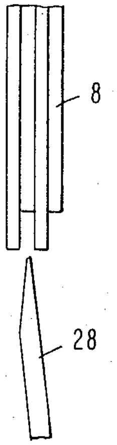
Figure 20:
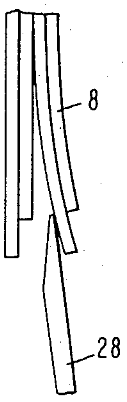
Figure 21:

FIGS. 19–21 indicate that in the present apparatus embodiment, of discs with staggered diameters providing edge delineation for the locating assembly, the blade motion invariably causes deflection to the right of the larger diameter interfacing disc, thereby permitting the transducer assembly to operate consistently on the shorter diameter discs at the left.

While the invention has been particularly shown and described with reference to a preferred embodiment thereof, it will be understood by those skilled in the art that various changes in form and detail may be made therein without departing from the spirit and scope of the invention.

What is claimed is:

1. In a random access data storage system, in which a laminar configuration of ultra-thin closely spaced flexible record discs is arranged for continual coaxial rotation as an aerodynamically stabilized unit subject while rotating to being flexibly displaced in a given direction, apparatus for flexing the rotating discs in said given direction at randomly selected lamination interfaces of the aggregate configuration in order to provide stable openings at said interfaces suitable for allowing transducing access to annular interior recording zones of the interfacing disc surfaces, comprising:

a blade having an airfoil contour on one side thereof mounted for translational movement parallel to the rotational axis of the discs in a disengaged position relative to said discs and for oblique linear movement relative to the discs at randomly selected lamination interface positions, the latter movement characteristically skewed in said given direction at an oblique angle relative to the undisturbed rotational paths of the discs encountered in and disturbed by such movement; said contoured side of said blade being configured to form a rotationally supportive stable lubricating air film by hydrodynamic action relative to said disturbed discs; said oblique movement being directed at an angle in the range 4° to 11° relative to the undisturbed rotational paths of said encountered discs.

2. Apparatus according to claim 1, wherein the said blade movement is in a chordal path relative to said discs and bends the orbits of said encountered discs along a predetermined chord of their circles of undisturbed revolution.

3. Apparatus according to claim 1 wherein said oblique movement angle is in a critical range of approximately four to eight degrees relative to the undisturbed paths of revolution of the discs.

4. Apparatus according to claim 1 wherein the discs are magnetic oxide coated plastic films approximately 0.0017 inches thick and the unit comprises at least 100 such discs mounted substantially contiguously in said laminar configuration.

5. Apparatus according to claim 1 wherein the discs are vertically oriented, with their common axis of rotation horizontal, and wherein the center of gravity of the encountered discs is below the axis of rotation.

6. Appratus according to claim 5 wherein the blade comprises a hollow closed structure having openings, in a leading edge thereof which intercepts the air carried between the disturbed and undisturbed discs, and having a supply port suitable for conduction of externally pressurized air to said openings via the hollow interior of said structure.

7. Apparatus according to claim 6 wherein said leading edge openings are oriented to direct said pressurized air into the space between separated discs at an oblique angle relative to the encountered discs within a critical range of about 7°–11° relative to the undisturbed paths of rotation of the discs.

8. Apparatus according to claim 2 wherein the camber of the blade contour is continuously varied along the length of the blade to enable said lubricating film of air to form smoothly during the initial encounter of said blade with the encountered discs and thereby reduce the tendency of the interface opening formed by the blade to vary in an unstable mode.

9. Apparatus according to claim 1 wherein the blade has a shape resembling a swept airplane wing.

10. Apparatus according to claim 1 wherein the blade is formed of welded parts surrounding a hollow space, one of said parts having said airfoil contours; said one part and another said part having openings for transferring externally pressurized air through said hollow space to the interface space between discs partitioned by operation of said blade.

* * * * *